Feb. 21, 1961 C. W. MacMILLAN 2,972,256
BALANCE TESTING DEVICE
Filed July 12, 1954 5 Sheets-Sheet 1
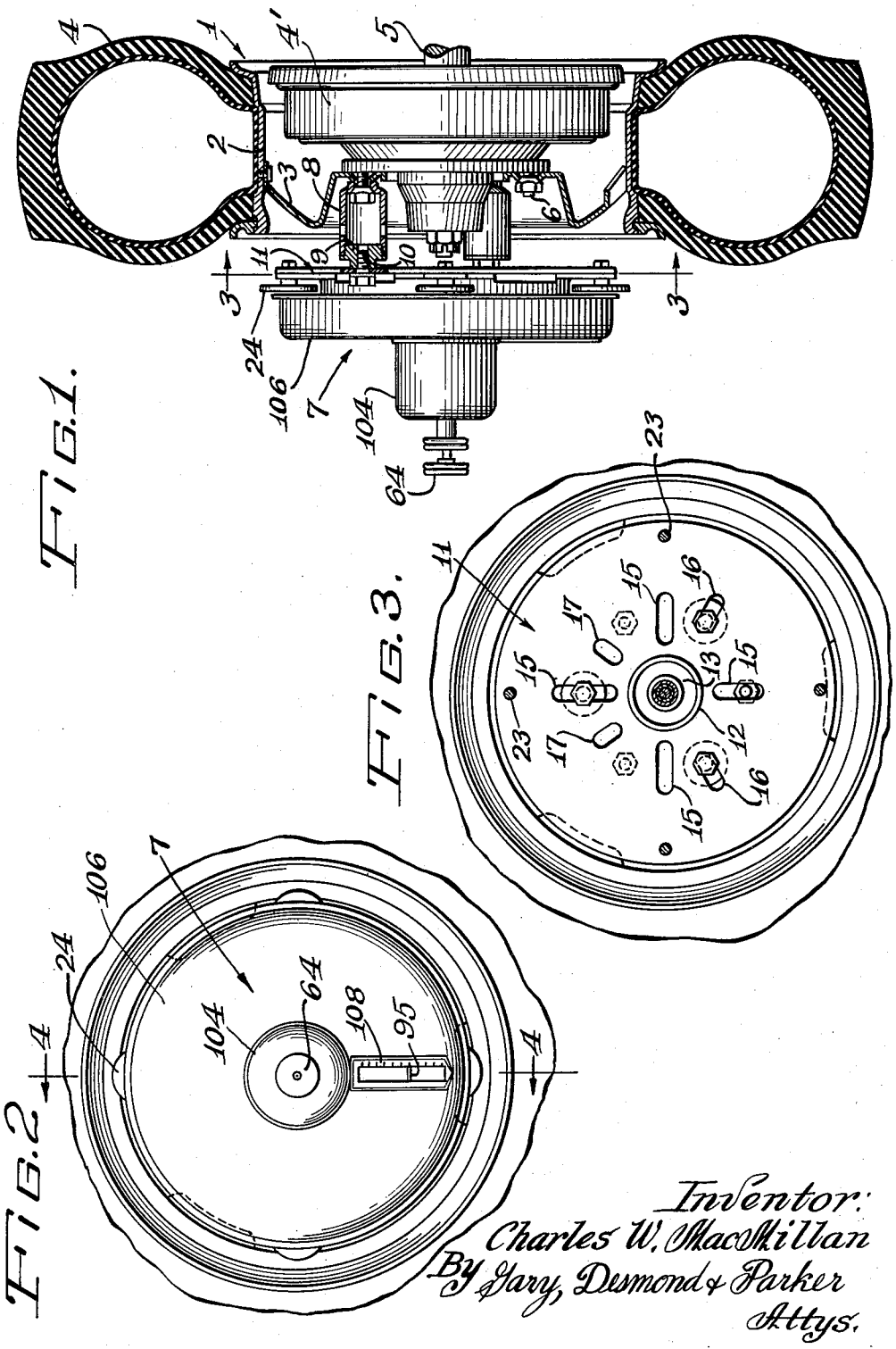
Inventor:
Charles W. MacMillan
By Gary, Desmond & Parker
Attys.

Feb. 21, 1961 C. W. MacMILLAN 2,972,256
BALANCE TESTING DEVICE
Filed July 12, 1954 5 Sheets-Sheet 2
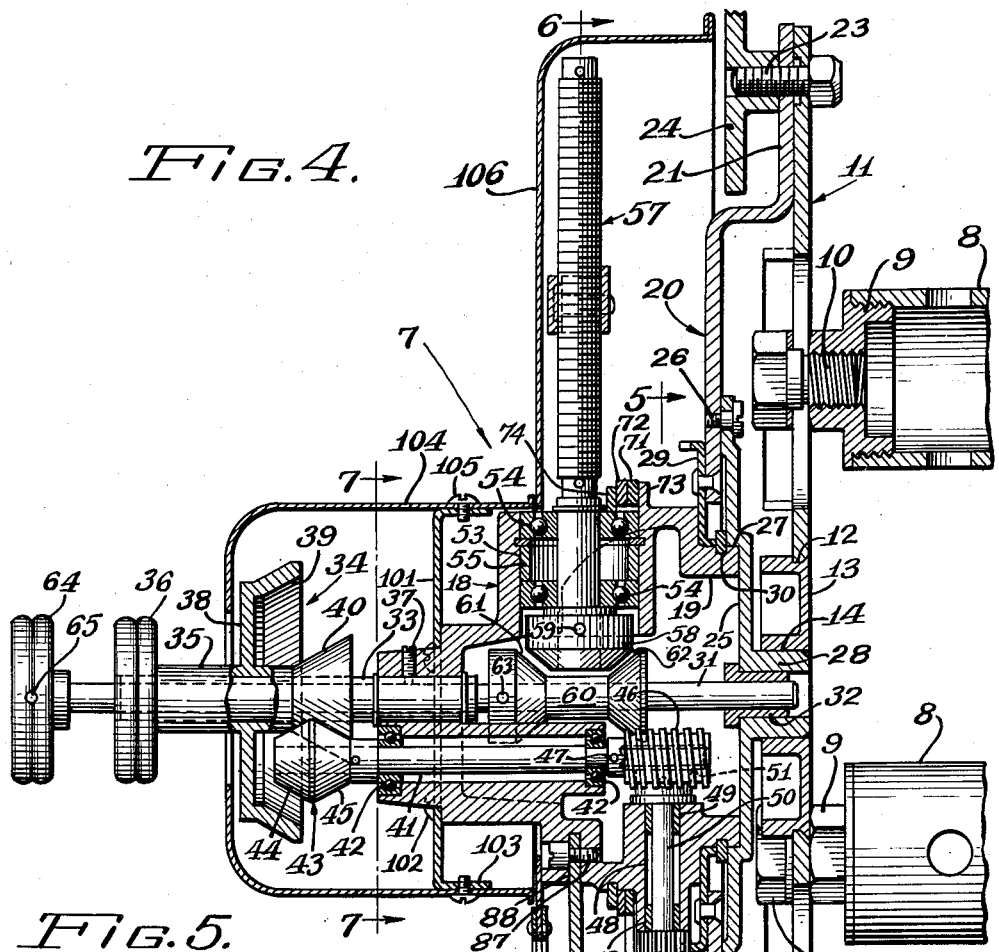
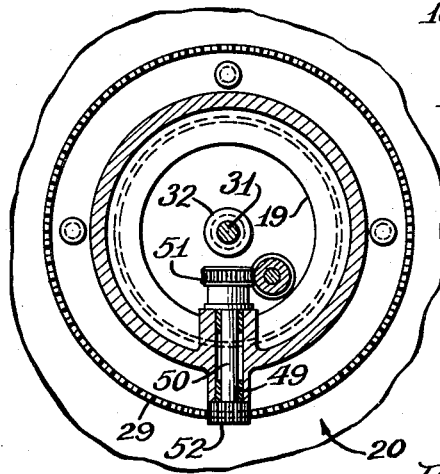
Inventor:
Charles W. MacMillan
By Gary, Desmond & Parker
Attys.

Feb. 21, 1961 C. W. MacMILLAN 2,972,256
BALANCE TESTING DEVICE
Filed July 12, 1954 5 Sheets-Sheet 3
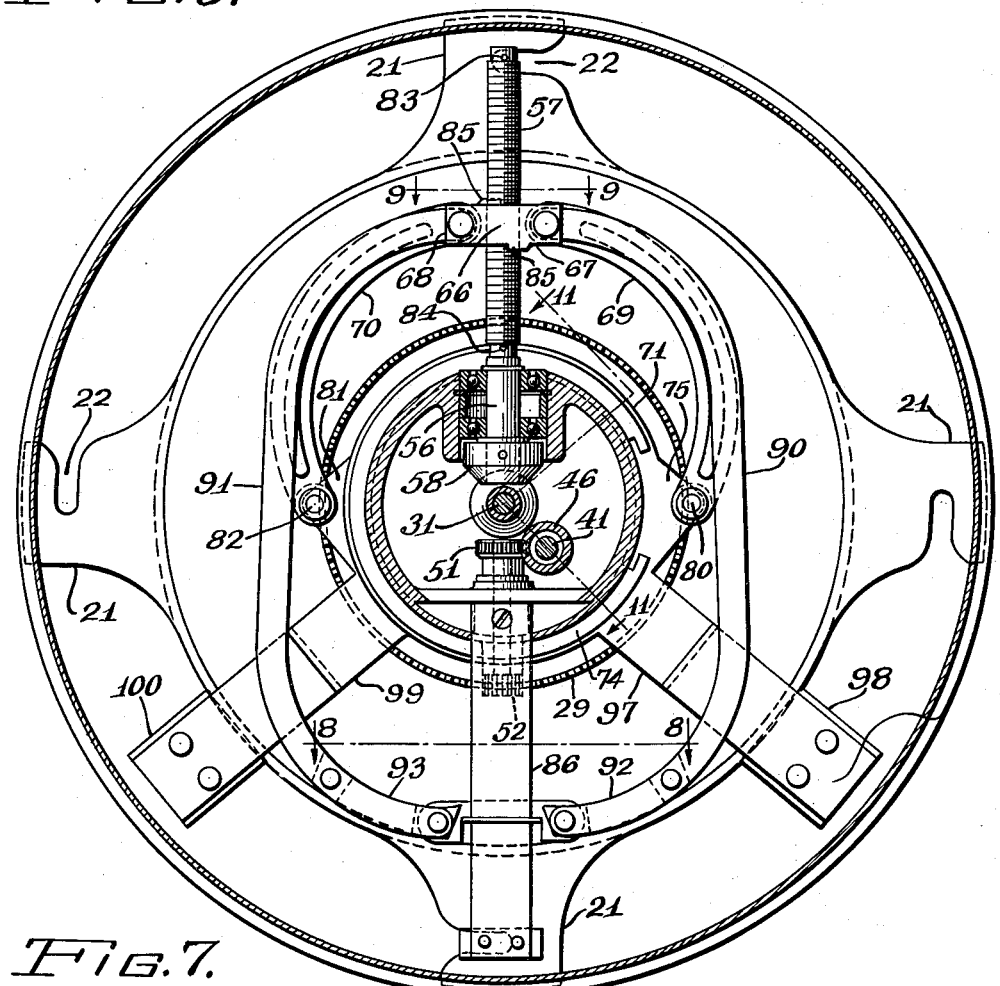
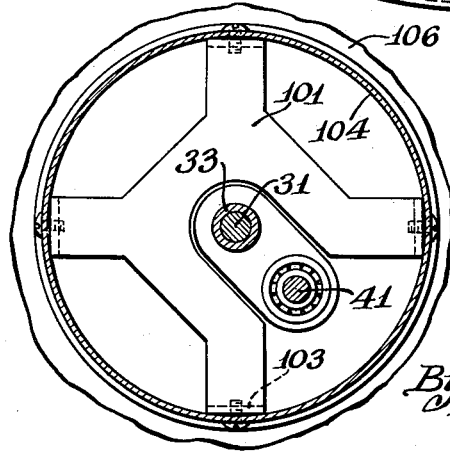
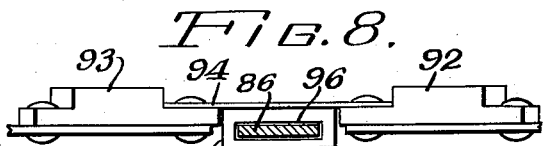
Inventor:
Charles W. MacMillan
By Gary, Desmond & Parker
Attys.

Feb. 21, 1961

C. W. MacMILLAN 2,972,256

BALANCE TESTING DEVICE

Filed July 12, 1954

Inventor:
Charles W. MacMillan
By Gary, Desmond & Parker
Attys.

Feb. 21, 1961 C. W. MacMILLAN 2,972,256
BALANCE TESTING DEVICE
Filed July 12, 1954 5 Sheets-Sheet 5

Inventor:
Charles W. MacMillan
By Gary, Desmond & Parker
Attys.

United States Patent Office 2,972,256
Patented Feb. 21, 1961

2,972,256
BALANCE TESTING DEVICE

Charles W. MacMillan, Rock Island, Ill., assignor to Bear Manufacturing Company, Rock Island, Ill., a corporation of Delaware Filed July 12, 1954, Ser. No. 442,627

4 Claims. (Cl. 73—458)

This invention relates to improvements in a device for testing the balance of rotating bodies and refers particularly to a device for testing the balance of a rotating body while the body is in situ in its normal operational environment.

The present invention is adaptable for testing the condition of balance of substantially any rotating body while the body is in situ in its normal operational environment, but for purposes of illustration, the applicability of the device to the testing of balance of an automotive wheel will be hereinafter set forth.

Devices have heretofore been proposed for ascertaining the condition of balance or unbalance of automotive vehicle wheels, but in most such devices it is necessary to remove the wheel to be tested from the vehicle. This involves removing the wheel from the vehicle; mounting the wheel on the testing machine; making the test; adding weight to balance the wheel; removing the wheel from the testing machine, and remounting it upon the vehicle. Obviously, this is a laborious, time-consuming task.

The present invention resides in a device which can ascertain the state of balance of a vehicle wheel without removing the wheel from the vehicle, it only being necessary to jack up the wheel to be tested; apply the testing device; make the test measurements; apply the necessary counterbalancing weights, and lower the wheel from the jack.

In ascertaining the balance of a vehicle wheel while in situ upon the vehicle and balancing the wheel, a much more accurate ultimate balance is obtained, since the wheel is balanced under substantially actual running condition. This is true of all four wheels of the vehicle and is particularly important with respect to the front wheels of the vehicle.

Other features, objects and advantages of the present invention will be apparent from the accompanying drawings and following detailed description.

In the drawings,

Fig. 1 is a side elevational view, parts being shown in section, of the improved balance testing device as applied to a vehicle wheel.

Fig. 2 is a front elevational view of the device shown in Fig. 1.

Fig. 3 is a sectional view taken on line 3—3 of Fig. 1.

Fig. 4 is an enlarged sectional view of the device, taken on line 4—4 of Fig. 2.

Fig. 5 is a sectional view taken on line 5—5 of Fig. 4.

Fig. 6 is a sectional view taken on line 6—6 of Fig. 4.

Fig. 7 is a sectional view taken on line 7—7 of Fig. 4.

Fig. 8 is a detailed sectional view taken on line 8—8 of Fig. 6.

Fig. 9 is a detailed sectional view taken on line 9—9 of Fig. 6.

Figure 10:
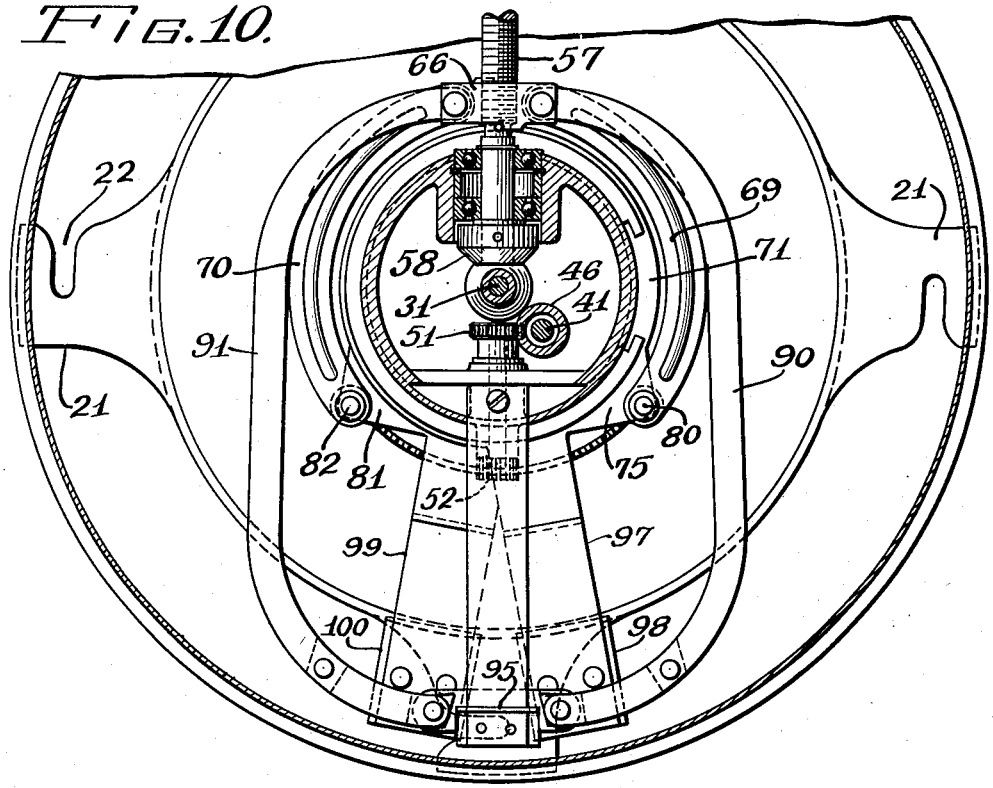
Fig. 10 is a view similar to Fig. 6 showing the parts in a different position.

Referring in detail to the drawings and with specific reference to Fig. 1 thereof, 1 indicates a conventional automobile wheel comprising rim 2 and web 3. A conventional tire 4 is mounted upon the rim 2. A conventional brake drum assembly 4' is mounted upon the automobile wheel spindle 5 and the web 3 of the wheel is normally secured to the drum assembly by the usual wheel bolts 6.

The reference numeral 7 indicates generally the improved balance testing device comprising the concepts of the present invention, said device being adapted to be mounted upon the wheel assembly while the wheel is maintained on the vehicle.

To mount the device 7 upon the wheel 1, assuming that the wheel 1 is a front wheel of the vehicle, the front portion of the vehicle is jacked up so that both front wheels are free of the ground. In most domestic automobiles, four, five or six wheel bolts are usually employed. For purposes of illustration the wheel 1 is shown as being secured by six wheel bolts. After the wheel has been jacked up, three wheel bolts, 120 degrees apart, are loosened and the nut of one of said bolts is removed. A lug cup 8 comprising a hollow cylindrical member, open at both ends is positioned over the wheel bolt and the nut is again replaced within the lug cup thereby fastening the lug cup upon said wheel bolts. Lug cups, similar to lug cup 8 are in similar manner mounted upon the remaining wheel bolts spaced 120 degrees from the first-mentioned wheel bolt.

Each lug cup 8 is internally threaded at its outer end for the reception of an apertured plug 9 which threadedly engages the respective lug cup. Screws 10 are adapted to engage in each apertured plug and function to fasten an adapter plate 11 upon the lug cups 8.

In view of the fact that the lug cups mounted upon the wheel 1 are spaced 120 degrees apart, all of said lug cups will be of equal weight and, hence, the balance of the wheel will not be influenced by the addition thereto of the lug cups and auxiliary plugs and screws, hereinbefore described. The same would be true were the wheel fastened by four wheel bolts, in which case, four lug cups would be employed. However, were the wheel of the five-bolt type, three lug cups would be employed but one of said lug cups would be heavier than either of the other two employed, that is, the lug cup spaced 144 degrees from the other two would be heavier than the other lug cups which would be spaced 72 degrees from each other. Thus, the lug cups and auxiliaries would add no extraneous unbalance to the wheel.

The adapter plate 11, shown best in Figs. 3 and 4, comprises a circular disc having a central opening 12 in which a hub 13 is rigidly positioned, the hub 13 having a central opening 14. The body of the disc is provided with a plurality of circularly spaced radial slots 15, 16 and 17, adapted for the reception of screws 10.

In view of the fact that wheel bolts on different automobiles are spaced different distances from the center of the wheel, slots rather than mere circular holes are provided in the adapter plate 11. Where four lug cups are employed, slots 15 would be utilized; where five lug bolts are provided, lug cups would be associated with one slot 15 and slots 17, and where six wheel bolts are employed, lug cups would be associated with one slot 15 and the other two slots 16 (the latter being illustrated in the drawings). Thus, the adapter plate 11 can accommodate itself to the wheels of a large number of different type automobiles.

Of course, the present invention in its broad concepts, is not predicated upon the specific elements and members for securing the device 7 to the wheel, and any suitable securing means is contemplated. In addition, in its broad concepts the device 7 is not limited to use only in testing the balance of automotive vehicle wheels since the invention is equally applicable to the testing of balance of any rotating body, where the test is to be made upon the body while it is in situ in its normal environment.

Before the screws 10 are tightened to hold the plate 11 upon the lug cups 8, the plate is centered on the wheel 1. This may be accomplished by a centering arbor (not shown) which may be positioned through the opening 14 in the hub 13 and held in contact with the female recess provided in the outer end of the wheel spindle 5. The wheel may then be rotated and with the screws 10 sufficiently loose, the plate will center itself relative to the wheel. Screws 10 may then be manipulated to fasten the plate rigidly with respect to the lug cups 8.

The device 7 comprises a frame or casting 18 having at one end a substantially cylindrical flanged portion 19, the outer surface of which functions as a seat for a pilot plate 20. The pilot plate carries four radially extending arms 21 (Fig. 6) which are offset adjacent their end portions from the plane of the plate. Each arm 21 is provided with a notch 22 which is engageable with a bolt 23 carried by the adapter plate 11, there being four arms 21 and, hence, four bolts 23 carried by the adapter plate. By the proper manipulation of the pilot plate, the bolts 23 can be brought into engagement with the notches 22 and by means of fastening knobs 24, threadedly engage with bolts 23, the two plates 11 and 20 may be rigidly fastened together.

The pilot plate 20 also comprises a hub 25 which is secured by means of screws 26 to the central portion of the plate proper, said hub having an offset annular shoulder 27 which seats upon the outer surface of the flanged portion 19 of the body 18. The central portion of the hub 25 comprises a collar 28 which is adapted to be positioned in opening 14 in hub 13 of the adapter plate. A crown gear 29 is carried upon the pilot plate and the inner peripheral portion thereof seats upon flange 19. A locking ring 30 seats in an annular groove provided in the flange 19 and functions to space the inner peripheral portion of the crown gear from the shoulder 27 of hub 25.

As will be hereinafter more fully described, the pilot plate 20 is rotatable relative to the frame 18 under certain conditions, the parts being rotatively relatively moved by the crown gear 29.

A shaft 31 is journaled in the frame 18 being rotatably positioned at one end in a bearing 32 carried in hub 28 of the pilot plate. Intermediate its length shaft 31 is journaled in a sleeve 33 which is rotatably and axially immovably secured to frame 18 by set-screw 37. A clutch member 34, comprising a sleeve portion 35, is slidably and rotatably movable upon the sleeve 33. At one end of the slidable sleeve portion 35 a hand grip or knob 36 is mounted, said knob being immovably mounted relative to the sleeve portion 35. A disc 38 having a conical flange 39 is rigidly carried by the sleeve portion 35 and the end of said sleeve portion terminates in a conical friction member 40.

Figure 11:
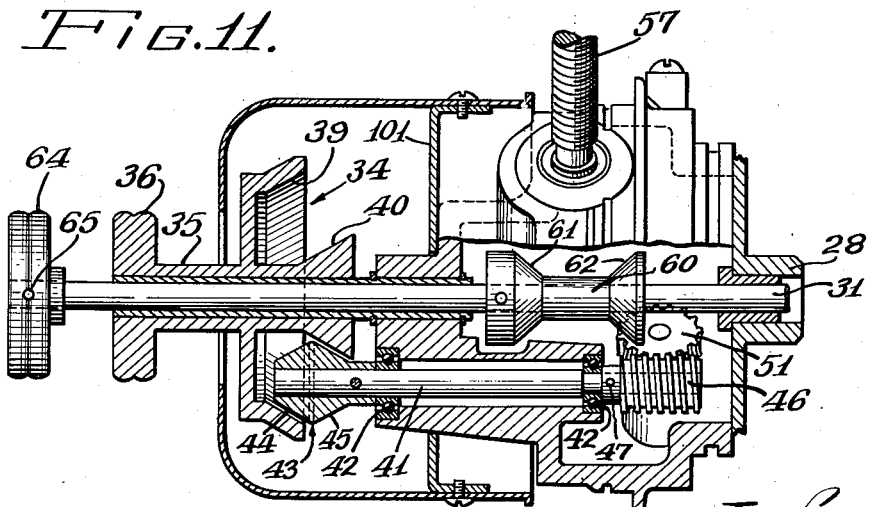
Fig. 11 is a detailed sectional view taken on line 11—11 of Fig. 6.

A shaft 41 is journaled in ball bearing assemblies 42 and is positioned with its axis parallel to shaft 31. A double conical head 43, having conical friction surfaces 44 and 45 is rigidly carried upon one end portion of shaft 41. A worm 46 is secured to shaft 41 at its opposite end portion by means of pin 47. An aperture 48 is provided in a portion of frame 18 adjacent worm 46 and bearings 49 are positioned adjacent opposite ends of said aperture, said bearings being adapted to rotatably carry a shaft 50. At one end of shaft 50 a worm wheel 51 (Figs. 4, 6 and 11) meshes with worm 46 and at the opposite end of said shaft a spur gear 52 is mounted which meshes with crown gear 29.

The arrangement is such that when the wheel under test is rotated, as will be hereinafter more fully described, the adapter plate 11 rotates and, in turn, rotates the pilot plate 20. By virtue of the meshing of the crown gear 29 and spur gear 52, such rotation tends to cause worm wheel 51 to drive worm 46. However, in view of the high degree of friction encountered in driving the worm wheel-worm arrangement in this direction, the driving torque thus developed causes the frame 18 to rotate with the pilot plate 20 and, hence, shaft 41 moves in orbital fashion around shaft 31.

For purposes to be hereinafter more fully described, it becomes desirable at predetermined times to change the angular relationship between pilot plate 20 and frame 18. To accomplish this change, the knob 36 may be grasped by an operator, the knob and clutch member 34 being freely rotatable with respect to sleeve 33, and the slidable sleeve 35 and clutch member may be moved inwardly or outwardly along sleeve 33. Such movement will engage surface 39 with surface 44 or surface 40 with surface 45 and thus, while the operator prevents rotary movement of the clutch member, shaft 41 will be rotated in one direction or the other about its axis. In this fashion worm 46 will readily drive worm wheel 51 and, hence, shaft 50 will be rotated thereby rotating gear 52 relative to the crown gear 29. Hence, frame 18 will be rotated relative to the pilot plate 20 in a desired direction and for a desired degree depending upon the duration of time that the clutch member has been maintained stationary and in contact with either surface 44 or 45 of the double conical friction head 43.

The frame 18 is provided with a cylindrical aperture 53 in which a pair of ball bearing assemblies 54 are positioned, said assemblies being spaced from each other by the cylindrical collar 55. Shank 56 of screw 57 is journaled in the assemblies 54 and a conical friction member 58 is carried at the end of said shank, said member being rigidly secured to shank 56 by pin 59. A spool 60, having opposite conical surfaces 61 and 62 is carried by shaft 31 and is rigidly secured thereto by pin 63. The spool 60 is so positioned upon shaft 31 that the conical surfaces 61 and 62 are disposed on opposite sides of, and adjacent the conical member 58. Shaft 31 extends through sleeves 33 and 35 and an end thereof protrudes through knob 36. A hand grip or knob 64 is carried upon said protruding shaft and is rigidly secured to the end portion of shaft 31 by means of pin 65.

The arrangement is such that when frame 18 rotates with pilot plate 20, the conical member 58 moves in an orbital fashion around spool 60. In the operation of the device, as will be hereinafter more fully described, it becomes desirable to rotate screw 57. To accomplish such rotation, the knob 64 may be grasped by an operator thereby preventing rotation of shaft 31. A knob may then be moved inwardly or outwardly relative to frame 18, that is, the shaft 31 may be moved axially thereby moving either surface 61 or surface 62 into contact with the orbital moving conical member 58. Hence, screw 57 will be rotated by virtue of the contact made between one or the other of the conical surfaces 61 or 62 of spool 60 and the conical surface of member 58.

A follower nut 66 threadedly engages screw 57, said nut being provided with opposite ears 67 and 68. An arcuate arm 69 is pivotally secured to ear 67 and a similar arm 70 is pivotally secured to the opposite ear 68. A ring 71 is rotatably positioned upon the outer surface of frame 18 and a similar ring 72 is also rotatably positioned upon frame 18. The rings 71 and 72 are confined for rotation upon the frame 18 between a ledge 73 comprising a portion of the frame and a locking ring 74 which is removably mounted upon the frame. The ring 71 carries an outwardly extending lug 75 which is pivotally secured, as at 80, to the opposite end of the arm 69. A similar lug 81 is carried by the ring 72 and arm 70 is pivotally connected as at 82 to the lug 81.

The arrangement is such that when screw 57 is rotated, nut 66 moves axially upon said screw. Axial movement of the nut 66 results in rotatable movement of the rings 71 and 72. For instance, if nut 66 is moved upwardly along screw 57, as viewed in Fig. 6, ring 71 will be moved counterclockwise and simultaneously ring 72 will be moved clockwise. If nut 66 moves downwardly along screw 57 ring 71 will move clockwise and ring 72 will move counterclockwise.

To prevent excess movement of the nut 66 upon screw 57 a pin 83 is carried by the screw adjacent its upper end and a similar pin 84 is carried by said screw adjacent its lower end. Lugs 85 are carried upon nut 66 and when the nut moves to either of its extreme positions either pin 83 or pin 84 will contact one of the lugs 85 and further rotation of the screw 57 will be prevented.

An indicator guide arm 86 is mounted upon frame 18, one end portion of said arm being secured to said frame by means of screw 87, the end portion of the arm so secured being positioned in a slot 88 provided in the frame 18. The arm 86 is of substantially rectangular cross section and the axis of said arm extends diametrically opposite to the axis of screw 57.

It is desirable that the frame 18 and the parts carried thereby be substantially balanced about the axis of rotation comprising the axis of shaft 31. Inasmuch as screw 57 extend radially outwardly from the casting or frame 18, the weight of said screw acts on a relatively long lever arm relative to the axis of the frame. In order to secure a virtual balance of the screw 57 a weight 89 is positioned at the end of the indicator guide rod 86.

An arm 90 which is curved adjacent its opposite ends is secured at one end to ear 67 of nut 66. A similar arm 91 is similarly secured to ear 68 of the nut. At its opposite end arm 90 is rigidly secured to a weight 92 and in similar fashion arm 91 is secured to weight 93. Between weights 92 and 93 a plate 94 is rigidly secured to said weights, said plate having a struck-up portion 95 which is provided with a rectangular aperture 96 whereby the struck-up portion 95 may be disposed in embracing relationship to the arm 86. As will be hereinafter more fully described the struck-up portion 95 of the plate 94 functions as a pointer which, depending upon the position of nut 66 upon screw 57, indicates a balanced condition of the device.

Ring 71 which is rotatably positioned upon frame 18 carries a radially extending arm 97 and at the end of said arm a balancing weight 98 is rigidly positioned. Similarly ring 72 carries a radially extending arm 99 which also carries a balancing weight 100 at its end.

It can readily be seen that when screw 57 is rotated and nut 66 moves axially upon said screw, the upward or downward movement of the nut 66 upon the screw will cause the rings 71 and 72 to rotate upon frame 18. When the rings 71 and 72 rotate, arms 97 and 99 move to different angular positions relative to each other thereby altering the condition of balance of the entire rotating assembly. In view of the fact that the angular variations of arms 97 and 99 are proportional to the movement of nut 66 along screw 57, and since the movement of nut 66 along screw 57 is reflected in similar movement of the struckup portion 95 along rod 86, it can readily be seen that the position of the struck-up portion of pointer 95 along rod 86 is an indication of the angular displacement of the arms 97 and 99. As will be hereinafter more fully described, this indication is employed in determining the condition of balance of the wheel under test.

A spider 101 is secured to frame 18 by means of screws 102 and the arms of said spider carry flanges 103. A substantially cup-shaped cover 104 embraces the rear portion of the device 7 and is secured to the flanges 103 by means of screws 105. The cup-shaped cover 104 functions as a closure for the rear central portion of the device 7.

A pan-shaped member 106 is also carried upon frame 18 and functions essentially as a cover for screw 57 and the remaining portions of the device 7 which extend radially from the frame 18. Adjacent the guide rod 86 along which the pointer 95 travels a slot 107 is provided in the cover member 106 and a calibrated scale 108 is secured adjacent said slot by means of rivets or the like 109. Thus, when the pointer 95 moves along the guide rod 86, as hereinbefore described, the position of said pointer will be indicated upon the calibrated plate 108. Thus, the reading of the position of the pointer 95 upon the calibrated plate 108 indicates the angular relationship of the weights 98 and 100.

In utilizing the device 7 to test the balance of a rotating body, for instance, the wheel illustrated in Fig. 1, after the front wheels of the automotive vehicle are jacked up and the adapter plate 11 is secured to the wheels and properly centered as hereinbefore described, the pilot plate 20 carrying the device 7 is mounted upon the adapter plate. The wheel under test, if it is the front wheel of the vehicle, will be rotated by a conventional wheel spinning device. Initially the follower nut 66 is positioned upon screw 57 at the upper end thereof. In this position the weight arms 97 and 99 in the device illustrated are 180° apart and in this position the device 7 is balanced.

With the wheel rotating, the knob 64 is grasped and pulled outwardly from the wheel thereby engaging the conical surface 62 of the spool 60 with the conical member 58. By thus engaging the two conical surfaces the screw 57 is rotated about its axis and the follower nut 66 is moved downwardly a relatively small degree to so move the weights 98 and 100 as to slightly unbalance the device 7. The knob 36 is then grasped and held so as to prevent rotation thereof and said knob may be pushed or pulled toward the wheel to engage the surfaces 44 and 39 or the surfaces 45 and 40. Such engagement will cause shaft 41 to rotate and hence spur gear 52 will rotate relative to the crown gear 29. The knob 36 is held in position to engage surfaces 44 and 39 or surfaces 45 and 40 until vibration evidenced by a vibratory movement of the bumper of the automobile decreases, that is, until a point is reached at which the vibration becomes a minimum. The knob 36 is then released and knob 64 grasped and moved inwardly or outwardly to change the angular relationship of the weight arms 97 and 99. By changing this angular relationship it will be found that the vibration will be further decreased. When minimum vibration is noted, the knob 36 is then manipulated to rotate shaft 41 in one direction or the other until a point is reached whereby the vibration becomes a minimum. It has been found that at about the second trial of the cycle of operations mentioned above, vibration will be substantially eliminated.

When the vibration has been substantially eliminated by following the hereinbefore described operational steps, the wheel is stopped and the position of the pointer 95 with respect to the calibrated scale 108 is noted. The scale 108 is calibrated in terms of weights which may be added to the wheel to properly balance the same, the weight indicated on the scale being added to the wheel in a position directly in alignment with the scale adjacent its radial outward end. With the counter-balancing weight added to the wheel, the operation hereinbefore described may be repeated as a check against the final balance of the wheel.

The balancer 7 is then removed from the wheel and may be applied to the opposite wheel and its condition of balance may be tested and proper weights may be added thereto. In the event that the rear wheels of the automotive vehicle are being balanced, said wheels may be driven by the automotive engine through the gear train of the vehicle. However, in this case, only one rear wheel is raised from the ground while the other remains on the ground so that the raised wheel will rotate.

Figure 12:
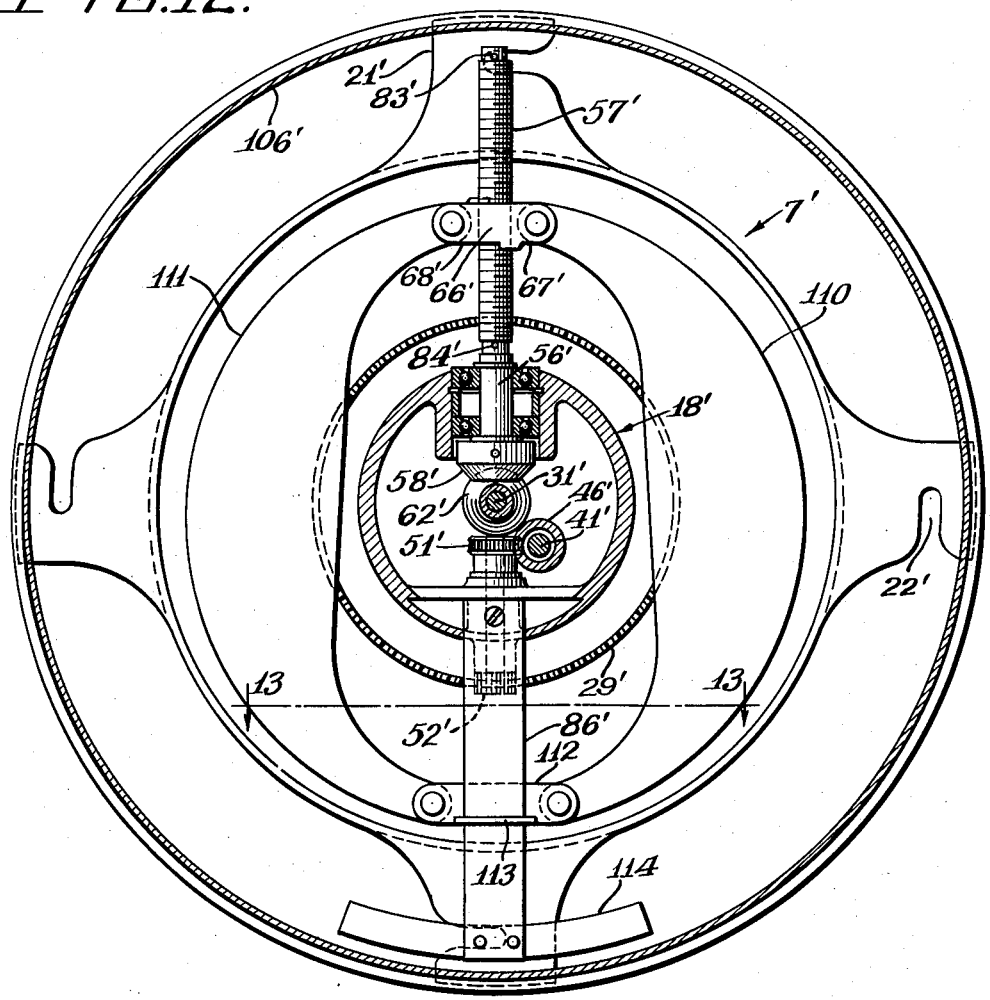
Fig. 12 is a view similar to Figs. 6 and 10 illustrating a modification of the invention.
Figure 13:
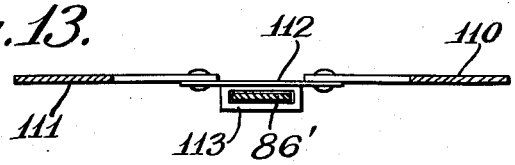
Fig. 13 is a detailed sectional view taken on line 13—13 of Fig. 12.

Referring particularly to Figs. 12 and 13, a modification of the invention is shown. In this form of the invention, the major portion of the parts, hereinbefore described, are the same and without further description identical parts in Figs. 12 and 13 will be designated with primed numerals corresponding to the parts hereinbefore described.

The essential difference between the two forms of the invention resides in the movable weights and their relationship to the remaining structure. A substantially crescent-shaped weight 110 is pivotally secured at one end to ear 67' of follower nut 66' which coacts with screw 57'. A similar weight 111 is similarly secured at one end to the ear 68' of nut 66' on the opposite side of screw 57'. At their opposite ends weights 110 and 111 are secured to a bridging member 112 which carries a struck-up apertured pointer 113 which loosely embraces the guide rod 86'. In order to normally balance the device 7' a weight 114 may be carried at the end of the rod 86', weight 114 being relatively larger than weight 89 carried by guide rod 86, hereinbefore described.

It will be noted that the center of gravity of weights 110 and 111, considered together, changes relative to the center of rotation of the device 7', that is, relative to the axis of shaft 31', when nut 66' is moved, and, hence, a balancing or unbalance effect is produced by weights 110 and 111, as they are moved by nut 66', which is similar to the angular movement of the weight arms 97 and 99, hereinbefore described.

In employing the device 7', with the nut 66' positioned at the end of screw 57' adjacent pin 83' and with the wheel under test and the device 7' rotating, the knob 64 is manipulated to rotate screw 57' and thus slightly unbalance the device 7'. Knob 36 may then be manipulated to change the angular relationship of the weights 110 and 111 with respect to shaft 31' until a minimum vibration point is noted. Knob 64 may then again be manipulated to move weights 110 and 111 lengthwise of screw 57' until a minimum vibration point is reached. Knob 36 may then again be manipulated, and so on, until vibration is imperceptible. The position of the pointer 113 may then be noted and appropriate weight may be added to the wheel.

Of course, the devices 7 and 7' may be employed in ascertaining the condition of balance of rotating bodies other than automobile wheels and the invention in its broadest concepts contemplate a device for ascertaining or testing the condition of balance of any rotating body, particularly one wherein the test is made with the body in situ in its normal operational environment.

I claim as my invention:

1. In a device adapted to be secured to a rotatable test body for testing and measuring the unbalance of said body while said body is rotating, including counter-balancing weight means for counter balancing the unbalance in said body, means for moving said weight means circumferentially relative to said body, means for increasing and decreasing the counter-balancing effect of said weight means, control means for the two last-named means, and means which indicate the degree of effectiveness and the circumferential position of said weight means, the improvement comprising that said control means comprises an axially shiftable rotatable control shaft coaxial with the device and the axis of rotation of said body, an axially shiftable rotatable control sleeve concentric with and encircling said shaft, a first pair of spaced opposite conical surfaces fixed coaxially on said shaft, a first conical member of a size smaller than the spacing between said first conical surfaces disposed between said surfaces, a second pair of spaced opposite conical surfaces fixed on said sleeve concentric therewith, a second conical member of a size smaller than the spacing between said second conical surfaces disposed between said surfaces, said sleeve having a manual control knob at one end thereof, said control shaft projecting beyond said knob and having a manual control knob adjacent its end, said control shaft and said sleeve being individually shiftable axially thereof by said knobs for selectively engaging the respective conical surfaces thereon with the respective conical member selectively to cause relative rotation of the respective conical member in opposite directions, one of said conical members being connected with the said means for increasing and decreasing the counter-balancing effect of said weight means and the other of said conical members being connected with the said means for moving said weight means circumferentially relative to the body.

2. In a device adapted to be secured to a rotatable test body for testing and measuring the unbalance of said body while said body is rotating, including counter-balancing weight means for counter-balancing the unbalance in said body, means for moving said weight means circumferentially relative to said body, means for increasing and decreasing the counter-balancing effect of said weight means, control means for the two last-named means, and means which indicate the degree of effectiveness and the circumferential position of said weight means, the improvement comprising that said control means comprises an axially shiftable rotatable control shaft coaxial with the device and the axis of rotation of said body, an axially shiftable rotatable control sleeve concentric with and encircling said shaft, a first pair of spaced opposite conical surfaces fixed coaxially on said shaft, a first conical member of a size smaller than the spacing between said first conical surfaces disposed between said surfaces, a second pair of spaced opposite conical surfaces fixed on said sleeve concentric therewith, a second conical member comprising a double conical head of a size smaller than the spacing between said second conical surfaces disposed between said surfaces, said second pair of conical surfaces comprising a conical surface adjacent said control shaft disposed inwardly of said second conical member relative to the axis of said control shaft and a conical surface disposed outwardly of and in encircling relation to said second conical member thereby to provide respectively for relatively slow and relatively fast adjustment of said second conical member, said sleeve having a manual control knob at one end thereof, said control shaft projecting beyond said knob and having a manual control knob adjacent its end, said control shaft and said sleeve being individually shiftable axially thereof by said knobs for selectively engaging the respective conical surfaces thereon with the respective conical member selectively to cause relative rotation of the respective conical member in opposite directions, one of said conical member being connected with the said means for increasing and decreasing the counter-balancing effect of said weight means and the other of said conical member being connected with the said means for moving said weight means circumferentially relative to the body.

3. In a device adapted to be secured to a rotatable test body for testing and measuring the unbalance of said body while said body is rotating, including counter-balancing weight means for counter-balancing the unbalance in said body, means for moving said weight means circumferentially relative to said body, means for increasing and decreasing the counter-balancing effect of said weight means, control means for the two last-named means, and means which indicate the degree of effectiveness and the circumferential position of said weight means, the improvement comprising that said control means consists essentially of a rotatable, axially shiftable control shaft coaxial with the device and the axis of rotation of the body, a rotatable, axially shiftable control sleeve concentric with and encircling said shaft, a spool having a pair of axially spaced opposite conical surfaces mounted coaxially on said shaft, a conical member of a size smaller than the spacing between said conical surfaces disposed between said surfaces with its axis at right angles to said shaft, said conical member being connected with the said means for increasing and decreasing the counter-balancing effect of said weight means, a drive shaft disposed in spaced parallel relation to said control shaft and connected with the said means for moving said weight means circumferentially relative to the body, a double conical head member on said drive shaft concentric therewith, and a pair of axially spaced opposite conical surfaces on said sleeve concentric therewith and disposed to opposite sides of said double conical head member, the latter member being of a size smaller than the spacing between the last-named opposite conical surfaces, said sleeve having a manual control knob at one end thereof, said control shaft projecting beyond said knob and having a manual control knob adjacent its end, said control shaft and said sleeve being individually shiftable axially thereof by said knobs for selectively engaging the respective conical surfaces thereon with the respective conical member selectively to cause relative rotation of the respective conical member in opposite directions.

4. In a device adapted to be secured to a rotatable test body for testing and measuring the unbalance of said body while said body is rotating, including counter-balancing weight means for counter-balancing the unbalance in said body, means for moving said weight means circumferentially relative to said body, means for increasing and decreasing the counter-balancing effect of said weight means, control means for the two last-named means, and means which indicate the degree of effectiveness and the circumferential position of said weight means, the improvement comprising that said control means consists essentially of a rotatable, axially shiftable control shaft coaxial with the device and the axis of rotation of the body, a rotatable, axially shiftable control sleeve concentric with and encircling said shaft, a spool having a pair of axially spaced opposite conical surfaces mounted coaxially on said shaft, a conical member of a size smaller than the spacing between said conical surfaces disposed between said surfaces with its axis at right angles to said shaft, said conical member being connected with the said means for increasing and decreasing the counter-balancing effect of said weight means, a drive shaft disposed in spaced parallel relation to said control shaft and connected with the said means for moving said weight means circumferentially relative to the body, a double conical head member on said drive shaft concentric therewith, and a pair of axially spaced opposite conical surfaces on said sleeve concentric therewith and disposed to opposite sides of said double conical head member, the latter member being of a size smaller than the spacing between the last-named opposite conical surfaces, said sleeve having a manual control knob at one end thereof, said control shaft projecting beyond said knob and having a manual control knob adjacent its end, said control shaft and said sleeve being individually shiftable axially thereof by said knobs for selectively engaging the respective conical surfaces thereon with the respective conical member selectively to cause relative rotation of the respective conical member in opposite directions, the said last-named opposite conical surfaces comprising a first conical surface adjacent said control shaft and disposed inwardly of said conical head member relative to the axis of said control shaft and a second conical surface disposed outwardly of and in encircling relation to said conical head member to provide respectively for relatively slow and relatively fast circumferential adjustment of said weight means relative to the body.

References Cited in the file of this patent
UNITED STATES PATENTS

| | | |
|---|---|---|
| 2,241,637 | Ernst et al. | May 13, 1941 |
| 2,662,396 | Hunter | Dec. 15, 1953 |
| 2,675,200 | Wohlforth | Apr. 13, 1954 |
| 2,680,974 | Hunter | June 15, 1954 |
| 2,696,108 | Hrebicek | Dec. 7, 1954 |
| 2,723,555 | Hunter | Nov. 15, 1955 |
| 2,731,833 | Jones | Jan. 24, 1956 |
| 2,779,196 | Hemmeter | Jan. 29, 1957 |